(12) United States Patent
Peng et al.

(10) Patent No.: US 7,200,002 B2
(45) Date of Patent: Apr. 3, 2007

(54) CONNECTION PORT MODULE

(75) Inventors: Hsueh-Chih Peng, Taipei Hsien (TW);
Ching-Yi Lu, Taipei Hsien (TW);
Chun-Ta Chen, Taipei Hsien (TW);
Yu-Ching Yang, Taipei Hsien (TW)

(73) Assignee: Acer Incorporated (TW)

( * ) Notice: Subject to any disclaimer, the term of this patent is extended or adjusted under 35 U.S.C. 154(b) by 131 days.

(21) Appl. No.: 11/017,685

(22) Filed: Dec. 22, 2004

(65) Prior Publication Data
US 2005/0157454 A1 Jul. 21, 2005

(30) Foreign Application Priority Data
Jan. 20, 2004 (TW) ............... 93201229 U

(51) Int. Cl.
*H05K 5/00* (2006.01)
*H05K 7/00* (2006.01)
(52) U.S. Cl. .............. 361/685; 361/686; 439/76.1
(58) Field of Classification Search ........ 361/686, 361/685; 439/76.1
See application file for complete search history.

(56) References Cited

U.S. PATENT DOCUMENTS 5,415,561 A * 5/1995 Mavrin et al. .......... 439/341
6,185,103 B1 * 2/2001 Yamada ................. 361/727
6,290,517 B1 * 9/2001 Anderson ............... 439/131
6,731,500 B2 * 5/2004 Allirot .................... 361/685
2002/0021551 A1 * 2/2002 Kashiwagi ............... 361/683
2003/0184617 A1 * 10/2003 Jones et al. .............. 347/49

\* cited by examiner

*Primary Examiner*—Lisa Lea-Edmonds
*Assistant Examiner*—Ingrid Wright
(74) *Attorney, Agent, or Firm*—Pillsbury Winthrop Shaw Pittman LLP

(57) ABSTRACT

A connection port module to be disposed in an opening of a panel of an electronic apparatus is disclosed. The connection port module includes a casing having an opening at a first side and a shaft at a second side, a printed circuit board disposed in the casing and having at least one connection port at a first edge thereof being corresponding to the opening of the casing, a fixing plate covering the casing and secured to the panel and having an engaging element, a resilient element disposed in the casing and resisting against the casing and the fixing plate, and a latch device disposed in the casing and having a hook element for engaging with the engaging element of the fixing plate. The connection port module is alternatively flipped outside of the panel and hidden inside the panel of the electronic apparatus via an external force exerted thereon.

20 Claims, 8 Drawing Sheets

CONNECTION PORT MODULE

FIELD OF THE INVENTION

The present invention relates to a connection port module, and more particular to a connection port module which can be alternatively flipped out to expose the connection ports of a computer host and hidden inside the computer host.

BACKGROUND OF THE INVENTION

Connection port is an input/output transmission interface for connecting the computer host with peripherals, even with household appliances. Always, the peripherals connected to the computer host, such as display, mouse, printer, scanner or keyboard etc., have different types of connection ports. In other words, each kind of peripherals may possess one respective connection port, such as a USB (Universal Serial Bus) or an audio terminal etc.

Recently, USB (Universal Serial Bus) has become an essential input/output connection port for personal computers. USB is a new standard jointly established by several computer hardware manufacturers and can be connected to all kinds of peripherals, such as mouse, keyboard, external CD-ROM drive or other peripherals which supports the USB connection. Furthermore, the USB connection has the plug-and-play function, so that the hot plugging can be performed without rebooting the computer. That's why USB has become an essential input/output connection port for personal computers.

Please refer to FIG. 1. A conventional computer host 1 has USB connection ports 11 mounted at the rear side thereof for supporting the connection with peripherals. However, for the user, it is actually inconvenient for connection when the USB connection port 11 is located at the rear side of the computer host 1, because the user has to move the computer host 1 to reach the USB connection port 11 so as to connect peripherals. Therefore, there exists an inconvenience under this situation.

To overcome the defect described above, as shown in FIG. 2, there is a design which disposes the USB connection port 21 at the front panel of the computer host 2 so as to benefit a direct connection for the user. Although it is advantageous for hot plugging when the USB connection port 21 is mounted at the front panel of the computer host 2, the USB connection port 21 will still suffer an unavoidable problem of dust pollution when it is not in use.

Consequently, it is needed to provide a connection port module which can overcome the defects in the prior art as described above and can be flipped out of the computer host as in use and hidden inside the computer host as not in use.

SUMMARY OF THE INVENTION

The object of the present invention is to provide a connection port module, which, on one hand, can be flipped out to expose the connection ports of the computer host for using and, on the other hand, can be hidden inside the computer host for backup, so as to benefit the usage for the user and also provide a dustproof effect.

To achieve the object above, in accordance with one aspect of the present invention, a connection port module disposed in an opening of a panel of an electronic apparatus is provided. The connection port module includes a casing having at least an opening at a first side thereof and a shaft at a second side thereof, a printed circuit board disposed in the casing and having at least a connection port at a first edge thereof which is corresponding to the opening of the casing, a fixing plate covering the casing and secured to the panel and having an engaging element, a resilient element disposed in the casing and resisting against the casing and the fixing plate, and a latch device disposed in the casing and having a hook for engaging with the engaging element of the fixing plate so that the connection port module can be alternatively flipped out to expose the connection port to the outside of the panel or hidden inside the panel via an external force exerted thereon.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
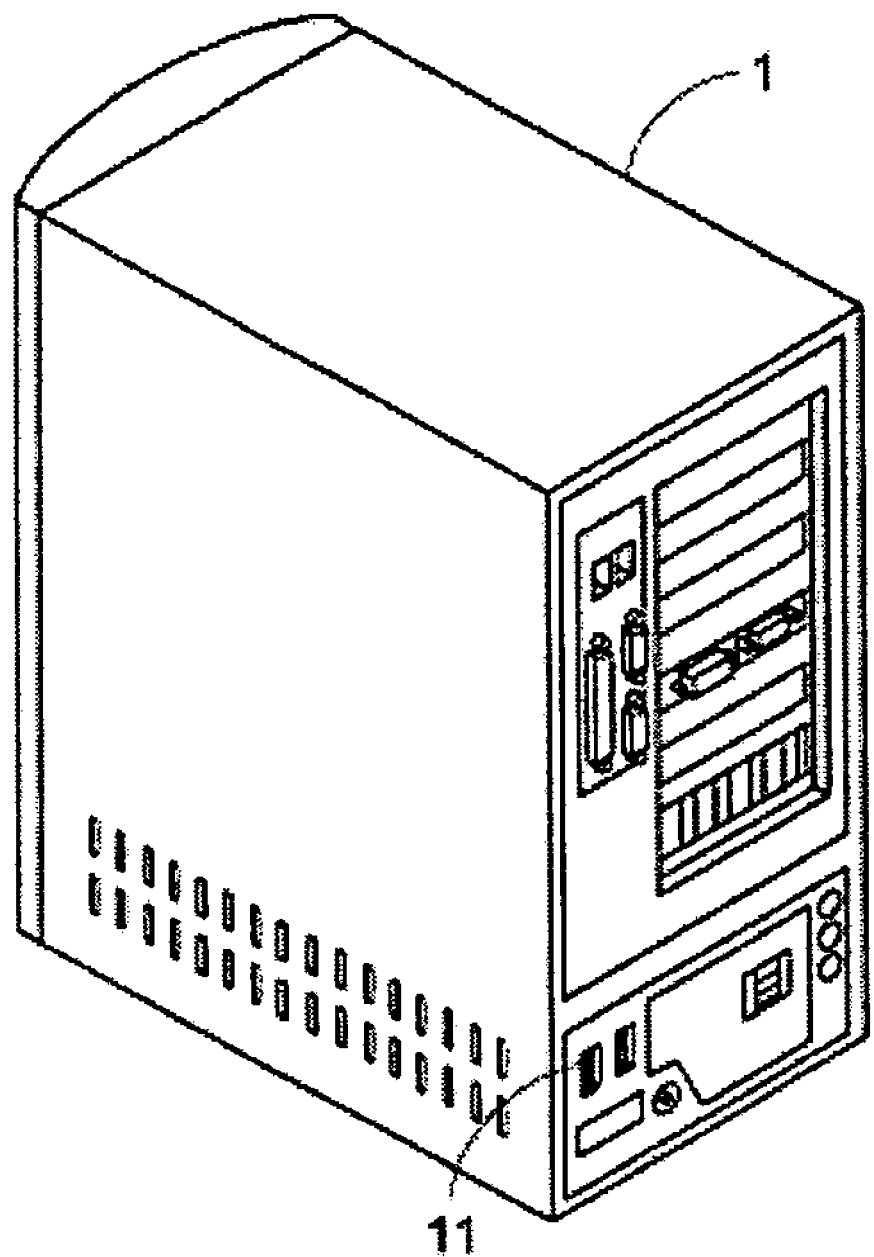
FIG. 1 is a schematic view showing a conventional computer host having the connection port at the rear side thereof.
Figure 2:
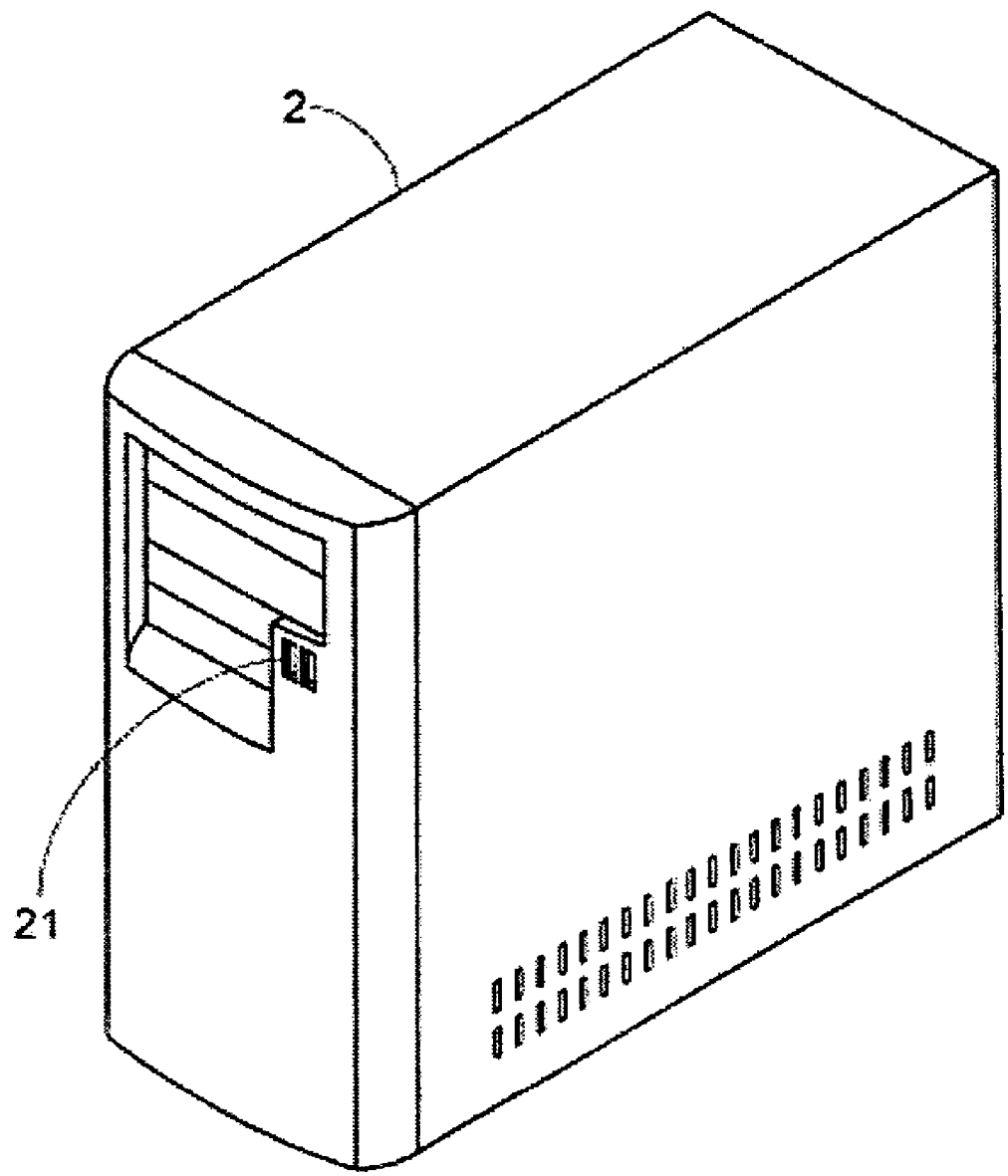
FIG. 2 is a schematic view showing another conventional computer host having the connection port at the front panel thereof.
Figure 3A:
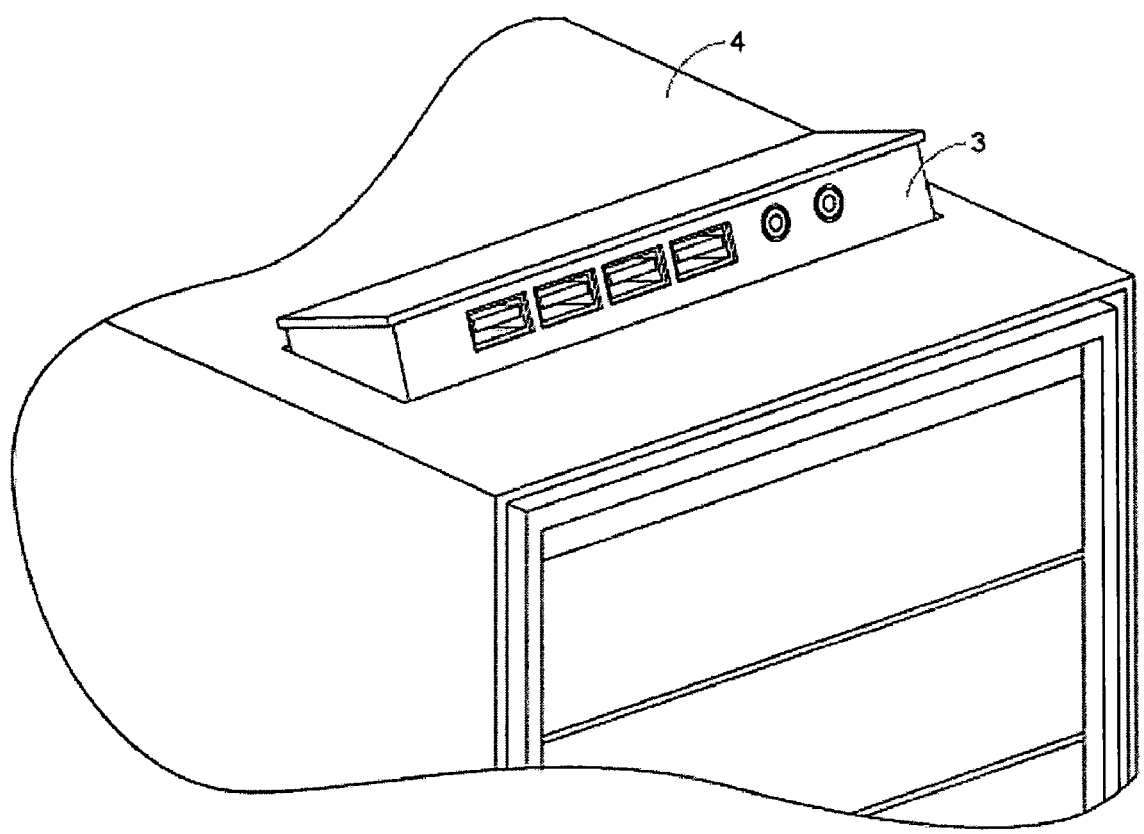
FIG. 3(a) is a schematic view showing a flip-out condition of a connection port module according to the preferred embodiment of the present invention.
Figure 3B:
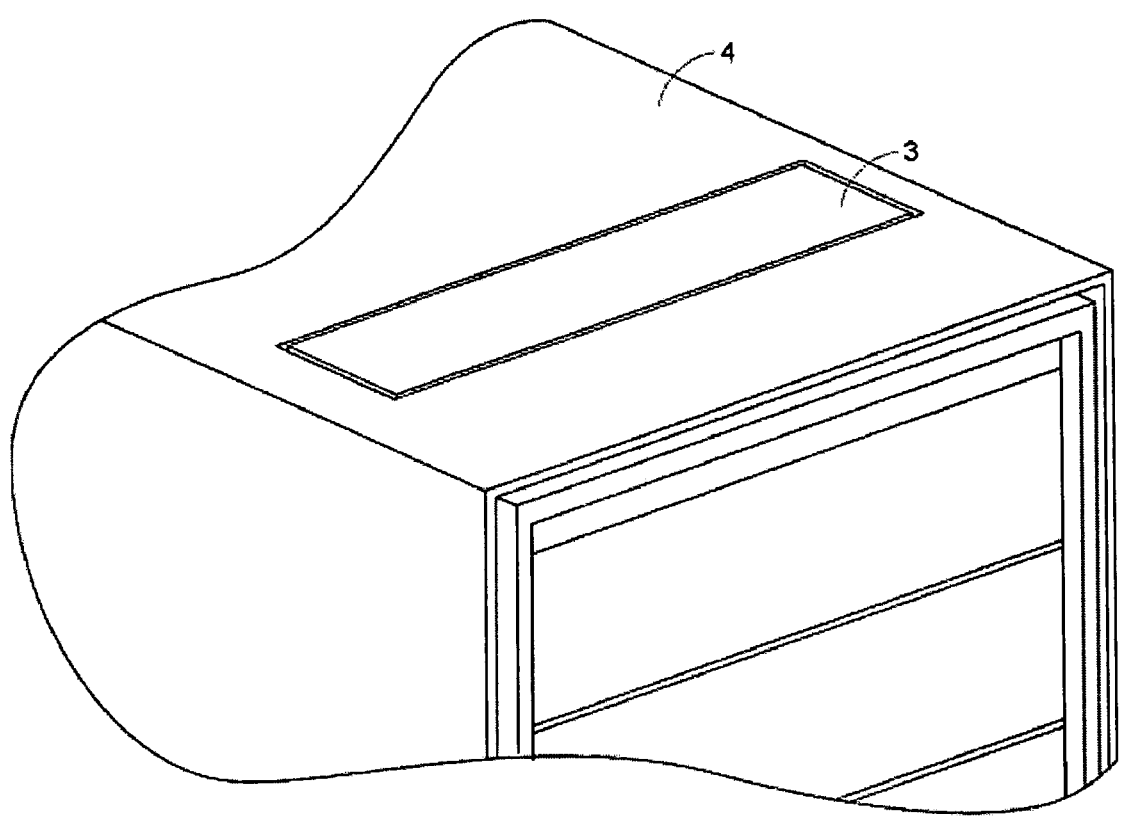
FIG. 3(b) is a schematic view showing a hidden condition of a connection port module according to the preferred embodiment of the present invention.

A connection port module 3 according to the present invention is mounted on a panel of a computer host 4. The connection port module 3, on one hand, can be flipped to be exposed connection ports to the outside of the computer host 4 via a flicking operation from an external force, as shown in FIG. 3(a), and, on the other hand, can be hidden inside the computer host 4 through another flicking operation from an external force, as shown in FIG. 3(b).

Figure 4:
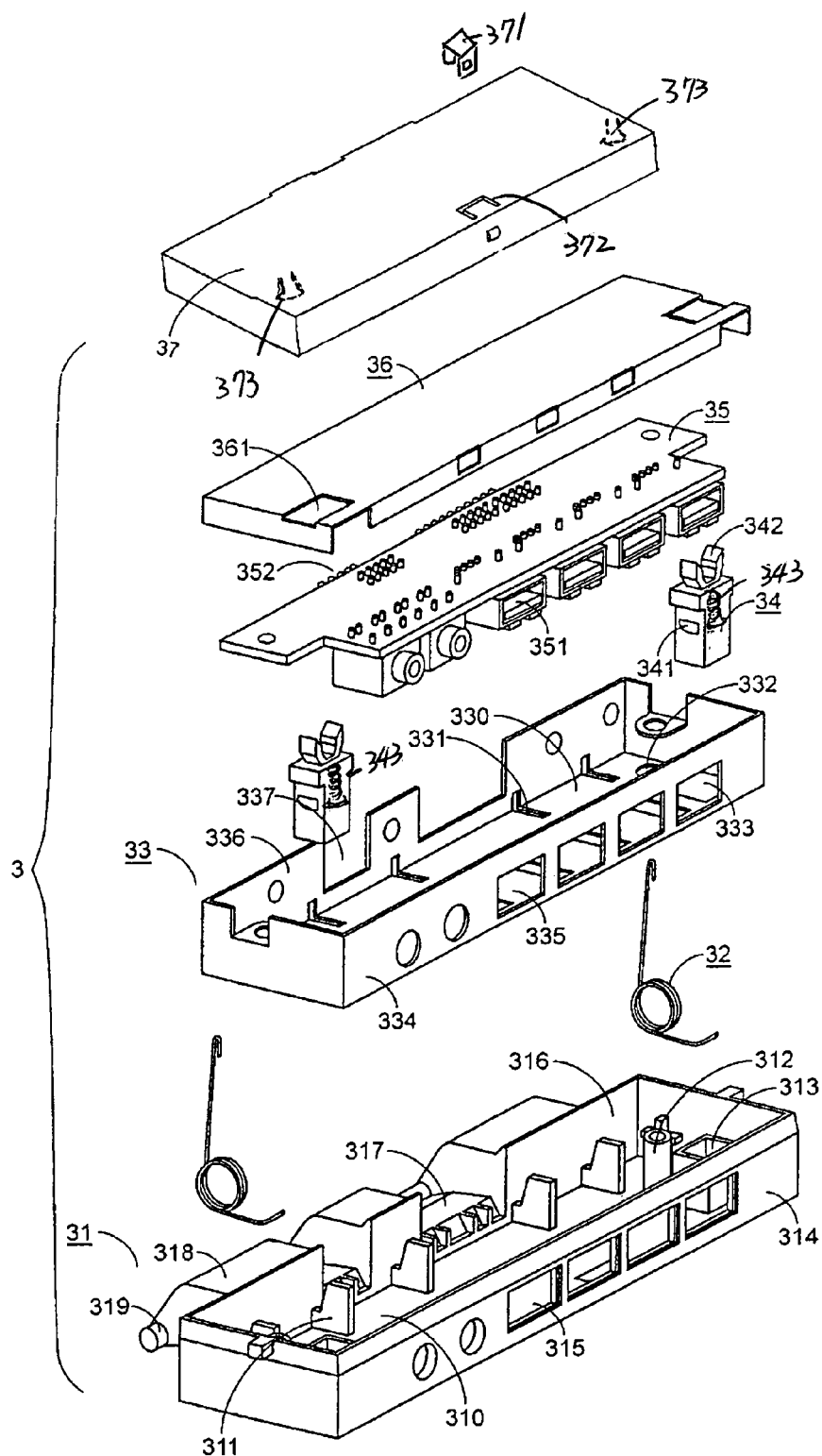
FIG. 4 is an exploded view showing a connection port module according to the preferred embodiment of the present invention.

Please refer to FIG. 4, which is an exploded view showing a connection port module according to a preferred embodiment of the present invention. As shown in FIG. 4, the connection port module 3 of the present invention mainly includes a casing 31, two resilient elements 32, a frame 33, two latch devices 34, a printed circuit board 35, a frame cover 36, and fixing plate 37. In this embodiment, the casing 31 is a rectangular solid and has an inner space 310, wherein a plurality of guiding plates 311, guiding cylinders 312 and slots 313 are mounted in the inner space 310. In addition, a first side 314 of the casing 31 has a plurality of openings 315 disposed thereon, and the openings 315 can have a rectangular and/or a round shape, but not limited thereto. Furthermore, a second side3 316 of the casing 31 includes one or more indentations 317 and a side plate 318 extending in a parallel direction, and the side plate 318 further has a shaft 319 mounted thereon.

The resilient element 32 is composed of wire having two ends being substantially oriented in a vertical direction and a middle portion formed as a ring portion. The two resilient elements 32 are respectively disposed on two opposite inner sidewalls of the casing 31 and fixed through the engagement of the ring portion with a circular protruding rib (not shown) on the inner sidewall of the casing 31. Moreover, the frame 33 is formed of iron and is also substantially a rectangular solid so that it can be disposed into the inner space 310 of the casing 31. The frame 33 has an accommodating space 330, and the bottom surface of the frame 33 further includes a plurality of slits 331, circular holes 332 and rectangular holes 333, which are respectively corresponding to the plurality of guiding plates 331, guiding cylinders 312 and slots 313 of the casing 31. Furthermore, the first side 334 of the frame 33 also includes a plurality of openings 335 which are respectively corresponding to the plurality of openings 315 of the casing 31. The openings 335 can also have a rectangular and/or a round shape, but not limited thereto. The second side 336 of the frame 33 also has one or more indentations 337 formed thereon that are corresponding to the indentations 317 of the casing 31. When assembling, the frame 33 can be mounted into the inner space 310 of the casing 31 so that the plurality of guiding plates 311, guiding cylinders 312 and slots 313 of the casing 31 can penetrate the plurality of slits 331, circular holes 332 and rectangular holes 333 of the frame 33 respectively, and thus, the openings 315 and the indentations 317 of the casing 31 can be respectively corresponding to the openings 335 and the indentations 337 of the frame 33.

The latch device 34 includes a pillar 341 and a hook 342. The hook 342 is connected to a spring 343 inside the pillar 341 so that the hook 342 can be contracted with respect to the pillar 341 when the latch device 34 is compressed. Furthermore, the latch devices 34 can be mounted in the slots 313 of the casing 31 after the frame 33 has been disposed in the inner space 310 of the casing 31 after the printed circuit board 35 is disposed in the accommodating space 330. Besides, the printed circuit board 35 includes one or more connection ports 351 mounted along a first edge thereof, and the connection port 351 can be a USB port, an audio/output terminal, a PS/2 connection port, an IEEE 1394 port, and the like. Furthermore, the second edge of the printed circuit board 35 has a plurality of terminals 352 mounted thereon, and these terminals 352 can be connected to corresponding cables (not shown) through the indentations 337 so as to electrically connect the printed circuit board 35 with the internal circuit system of the computer host. When the printed circuit board 35 is mounted in the accommodating space 330 of the frame 33, the connection port 351 will be exactly corresponding to the openings 335 of the frame 33.

The frame cover 36 will cover the frame 33 after the printed circuit board 35 is disposed in the accommodating space 330 of the frame 33 and will be fixed to the guiding cylinders 312 of the casing 31 through a screw. The frame cover 36 further comprises a plurality of openings 361 being corresponding to the latch devices 34 disposed in the slots of the casing 31. Thus, when the frame cover 36 is fixed on the frame 33, the hook 342 of the latch devices 34 will be exposed outside the frame cover 36. When the connection port module 3 is mounted on a panel of the computer host, the fixing plate 37 can be used to cover the connection port module 3, and fix the connection port module 3 to the panel. And, there is at least one engaging element 373 at the bottom surface of the fixing plate 37, such as a bulge, which is located correspondingly to the hook 342 of the latch device 34. When the connection port module 3 is hidden inside the panel of the computer host, the engaging element can be engaged with the hook 342 of the latch device 34 so as to fix the connection port module. Furthermore, after the fixing plate has been fixed, the other end of the resilient element 32 will preserve a resilient force owing to the resistance against the bottom surface of the fixing plate 37. Thus, when the hook 342 detaches from the engaging element 373 of the fixing plate 37 on account of an external force, the preserved resilient force will immediately force the connection port module 3 to rotate around the shaft 319 so as to enable the connection port module 3 to flip outside the panel to expose the connection ports of the computer host.

Please further refer to FIG. 4. The assembling method for the connection port module 3 of the present invention will be described as follows. First, the resilient element 32 is disposed at the inner sidewall of the casing 31 and fixed through the engagement of the circular protruding rib on the inner sidewall of the casing 31 with the ring portion of the resilient element 32. Then, the frame 33 is disposed into the inner space 310 of the casing 31, wherein the frame 33 can further confine the resilient element 32 between the frame 33 and the casing 31 to avoid the resilient element 32 from falling off. Subsequently, the printed circuit board 35 is disposed in the accommodating space 330 of the frame 33, and then the latch devices 34 are mounted in the slots 313 of the casing 31. Finally, the frame cover 36 is covered on the frame 33 and fixed by a screw. Therefore, the hooks 342 of the latch devices 34 will be exposed outside the frame cover 36. In addition, one end of the resilient element 32 is upwardly extended between the sides of the casing 31 and the frame 33.

Figure 5:
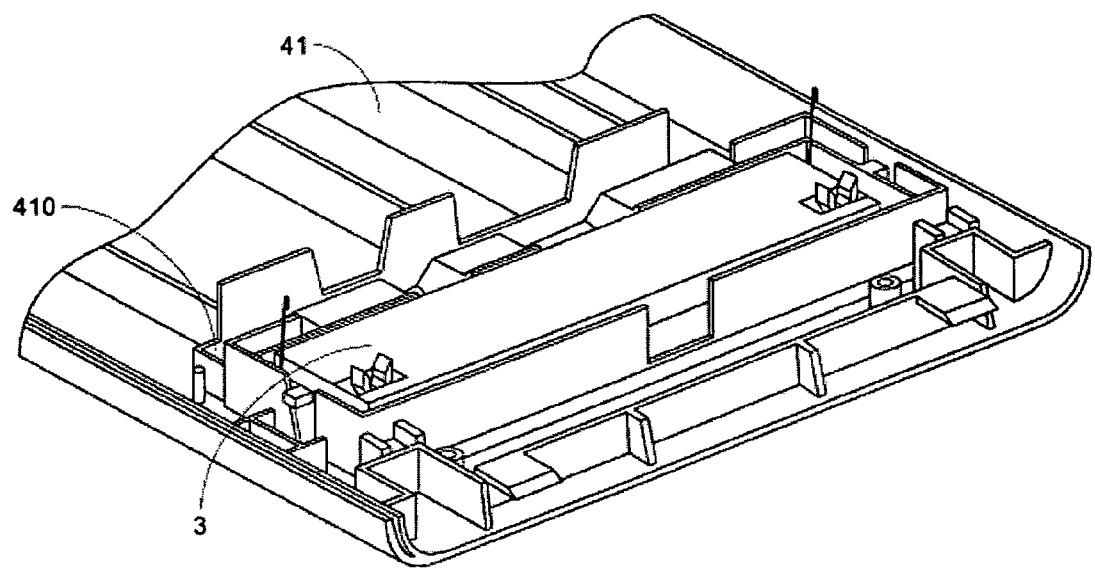
FIG. 5 is a schematic view showing a connection port module mounted at a panel of a computer host according to the preferred embodiment of the present invention.
Figure 6:
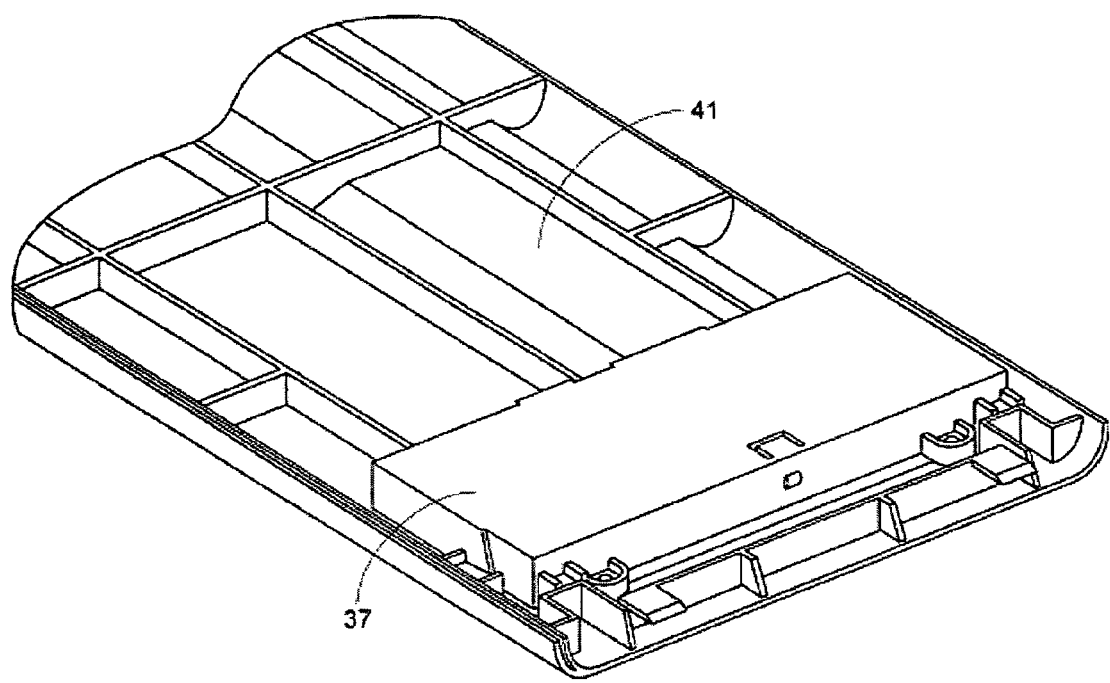
FIG. 6 is a schematic view showing a connection port module covered and fixed by a fixing plate according to the preferred embodiment of the present invention.
Figure 7:
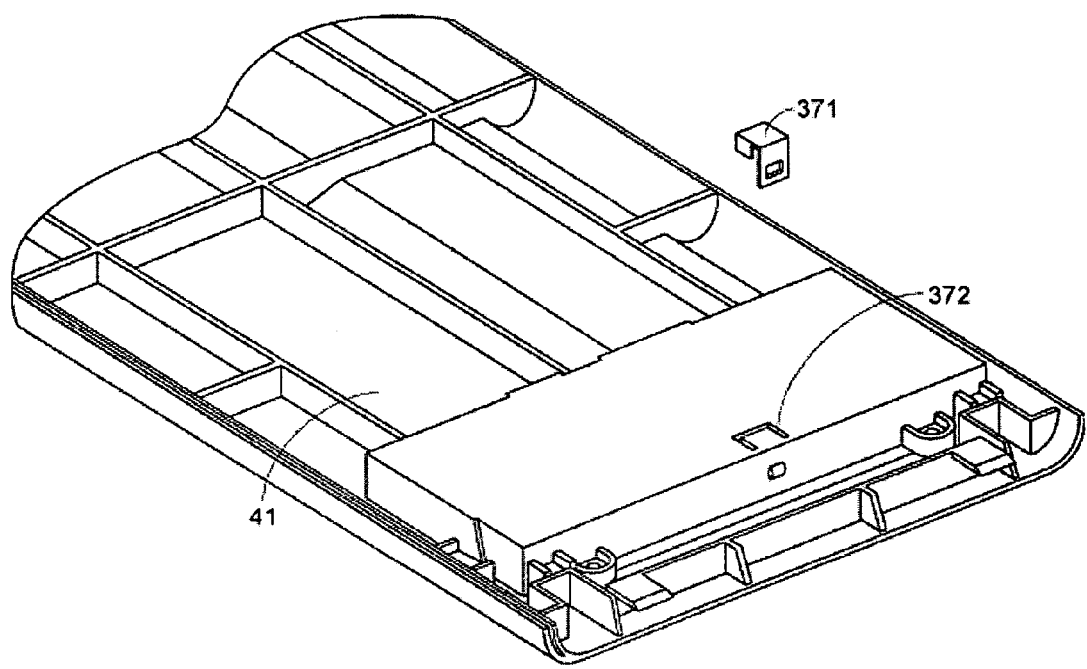
FIG. 7 is a schematic view showing a connection port module fixed and locked through a bolt according to the preferred embodiment of the present invention.

Please refer to FIG. 5, which shows the assembled connection port module 3 disposed on a panel 41 of the computer host. In an embodiment, the panel 41 is preferably an upper panel of the computer host. The panel 41 has an opening (not shown) at the inner side thereof, and a plurality of shaft supports 410 located near a side edge of the opening for bolstering up the shaft 319 of the casing 31. Then, as shown in FIG. 6, the fixing plate 37 is covered thereon and fixed by a screw, and afterwards the panel 41 is reversed and a decorative plate (not shown) is adhered to the casing 31 of the connection port module 3. Finally, the panel 41 is assembled on the upper surface, the front surface or a side surface of a computer case. Because the upper surface of the computer case has an inward receiving space, the connection port module 3 can be easily positioned therein. When there is a need to use the connection port, the user can only exert an external force to press the connection port module 3, and then the connection port module 3 will immediately be flipped outside the computer host 4, as shown in FIG. 3(a). If there is no further demand for the connection port, the user can exert another external force again to press the connection port module 3 so as to hide the connection port module 3 inside the computer host, as shown in FIG. 3(b).

However, for broadening the applicability of the present invention, a bolt 371 can be further employed to be plugged into a socket hole 372 of the fixing plate 372, so that there will not cause displacement between the hook 342 of the latch device 34 and the engaging element of the fixing plate 37 as a result of the external force. In addition, because the downward movement of the hook 342 of the latch device 34 is stopped thereby, the connection port module 3 can be constantly hidden inside the panel 41. Certainly, if the connection port module 3 is to be used, the bolt 371 can be removed.

The connection port module is not limited to be used for the computer host; other electronic apparatuses, such as servers, communication systems or household appliances, can be equipped with the inventive connection port module. Furthermore, the shape, number and location of the resilient element are not restricted by the embodiments described above. For example, the resilient elements can be located between the frame cover and the fixing plate. In addition, the shape, number and location of the latch device are not limited by the embodiments described above, and other applicable latch devices and other locations can also be used.

In view of the aforesaid description, the present invention provides a connection port module which, on one hand, can be flipped out to expose the connections ports of a computer host for using, and, on the other hand, can be hidden inside the computer host for backup. Therefore, the connection port of the present invention not only has the advantage of convenient use, but also avoids the problem of dust pollution.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connection port module disposed within a panel of an electronic apparatus, comprising:
   a casing having at least an opening at a first side thereof and a shaft at a second side thereof;
   a printed circuit board disposed in said casing and having at least a connection port at a first edge thereof corresponding to said opening of said casing;
   a fixing plate covering said casing and secured to said panel and having an engagement element on a bottom surface;
   a resilient element disposed in an inner wall of said casing and resisting against said casing and said fixing plate; and
   a latch device disposed in said casing and having a hook for engaging with said engaging element of said fixing plate such that said connection port module is alternatively flipped outside said panel and hidden inside said panel of said electronic apparatus via an external force exerted thereon,
   wherein the resilient element provides a resilient force against the bottom surface of said fixing plate when the latch device is engaged with the engagement element of said fixing plate and releases the resilient force when said latch device is disengaged with the engagement element of said fixing plate to force the connecting port module to rotate around said shaft and flip outside said panel to expose the at least one connection port of said printed circuit board.

2. The connection port module according to claim 1, further comprising:
   a frame disposed in said casing and having an accommodating space for positioning said printed circuit board therein and at least an opening at a first side thereof corresponding to said opening of said casing; and
   a frame cover for covering said frame.

3. The connection port module according to claim 2, wherein the bottom surface of said accommodating space of said frame further comprises a plurality of slits and holes.

4. The connection port module according to claim 3, wherein said casing is substantially a rectangular solid having an inner space, and a plurality of guiding plate, guiding cylinders and slots are disposed in said inner space and respectively corresponding to said slits and said holes of said frame.

5. The connection port module according to claim 4, wherein said latch device is dispose in said slots of said casing.

6. The connection port module according to claim 4, wherein said frame cover further comprises at least one opening which is corresponding to said latch device such that said hook of said latch device is exposed outside said frame cover through said opening of said cover.

7. The connection port module according to claim 2, wherein said frame further comprises at least an indentation formed on a second side thereof.

8. The connection port module according to claim 7, wherein said casing further comprises at least an indentation formed on a second side thereof and is corresponding to said indentation of said frame.

9. The connection port module according to claim 2, wherein said frame is formed of iron and is substantially a rectangular solid.

10. The connection port module according to claim 1, wherein said latch device further comprises a pillar having a spring therein, and said hook of said latch device is connected to said spring.

11. The connection port module according to claim 1, wherein said connection port is one selected from a group consisting of a USB (Universal Serial Bus) port, an audio input/output terminal, a PS/2 connection port, and IEEE 1394 port, and a combination thereof.

12. The connection port module according to claim 1, wherein said resilient element is formed by a wire having two ends being substantially oriented in a vertical direction and a middle portion formed as a ring portion.

13. The connection port module according to claim 12, wherein said resilient element is fixed through the engagement of said ring portion with a circular protruding rib on said inner sidewall of said casing.

14. The connection port module according to claim 1, wherein said electronic apparatus is a computer host.

15. The connection port module according to claim 1, wherein said panel is disposed on an upper surface of said computer host.

16. The connection port module according to claim 1, wherein said printed circuit board further comprises a plurality of terminals disposed at a second edge thereof.

17. The connection port module according to claim 1, wherein one end of said resilient element is resisting against a bottom wall of said fixing plate.

18. The connection port module according to claim 1, wherein said panel further comprises an shaft support at a side of said opening thereof for mounting said shaft of said casing.

19. The connection port module according to claim 1, wherein said fixing plate is secured to said panel through a screw.

20. The connection port module according to claim 1 further comprising a bolt mounted in a socket hole of said fixing plate for constantly hiding said connection port module inside said panel.

* * * * *